Figures 1, 2:
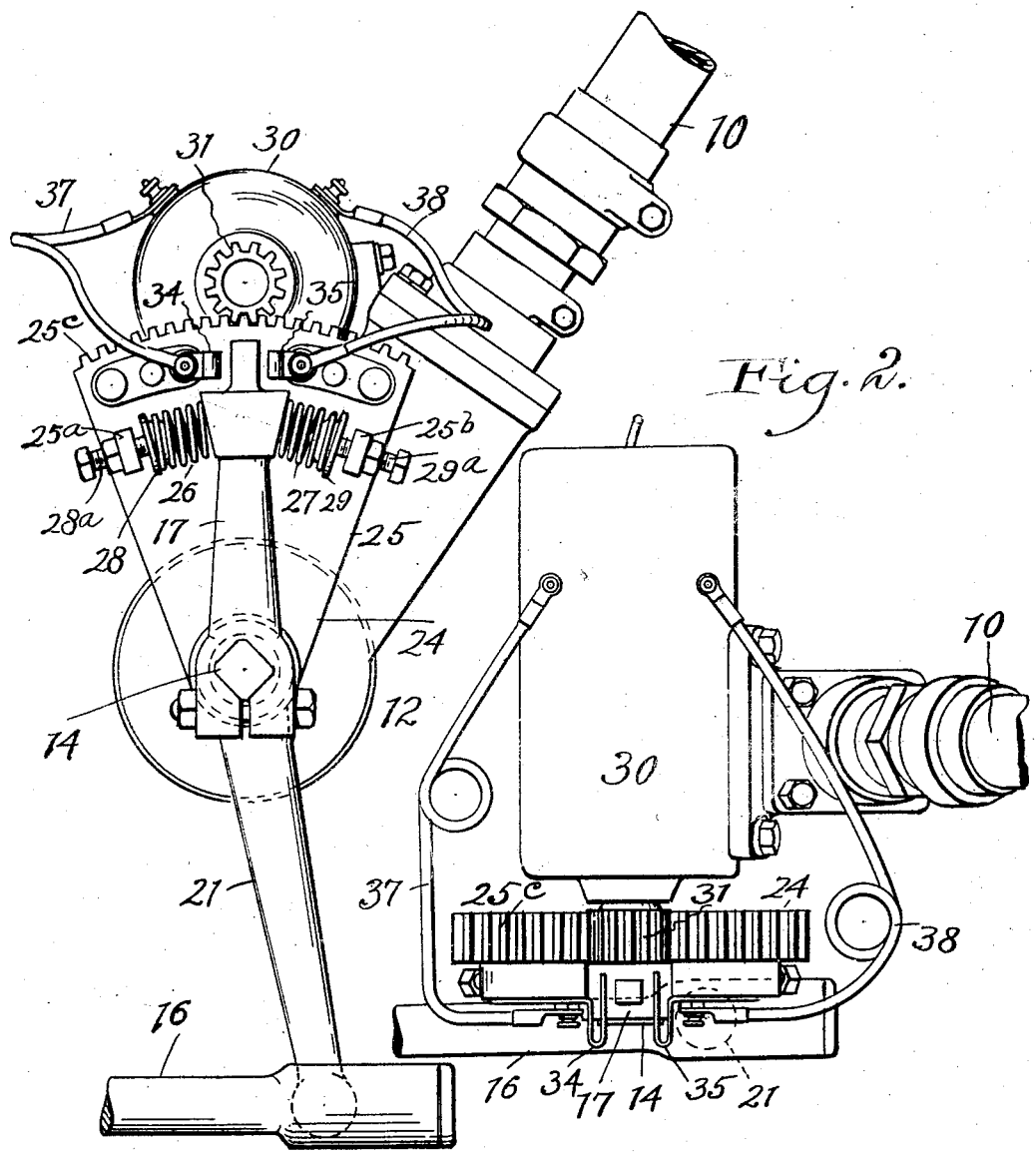

A. P. BRUSH.
DUAL CONTROL OF MECHANISM.
APPLICATION FILED SEPT. 16, 1918.

1,377,306.

Patented May 10, 1921.

Inventor.
Alanson P. Brush
By
Thurston & Rivers
attys

UNITED STATES PATENT OFFICE.

ALANSON P. BRUSH, OF DETROIT, MICHIGAN.

DUAL CONTROL OF MECHANISM.

1,377,306.  Specification of Letters Patent.  Patented May 10, 1921.

Application filed September 16, 1918. Serial No. 254,260.

*To all whom it may concern:*

Be it known that I, ALANSON P. BRUSH, a citizen of the United States, residing at Detroit, in the county of Wayne and State of Michigan, have invented a certain new and useful Improvement in Dual Control of Mechanism, of which the following is a full, clear, and exact description.

There are mechanisms of various sorts which encounter variable resistance in the performance of their functions, so that, under certain conditions and at certain times, the application of relatively slight force will cause said mechanisms to operate, while at other times and under different conditions it is necessary to apply much greater force to produce that result.

The present invention is applicable generally to mechanism of this sort regardless of their particular construction or purpose. The object is to associate with such a mechanism two operating instrumentalities, viz: a primary operating instrumentality through which enough force may be applied to the stated mechanism to cause it to function properly until the resistance to such functioning exceeds a predetermined maximum; and a secondary motor driven operating instrumentality which is normally inoperative but which will automatically come into action to aid the operation of said mechanism when and only when the resistance to the functioning of said mechanism to be operated exceeds the predetermined maximum.

Perhaps the invention will find its greatest field of usefulness in connection with mechanism which normally must be operated and controlled manually; in which event the means provided for bringing the secondary motor driven operating instrumentalities into action should be so organized and adjusted that they will produce that result when the power required to move the mechanism through the primary operating instrumentality exceeds that which the human operator can effectively exert.

The invention is exemplified in its application to a certain mechanism of this general character, namely, the steering mechanism of an automobile, although without any intention of restricting the invention to this particular application or use. When an automobile is running over a smooth compact road surface the driver has no difficulty whatever in operating the steering mechanism. If, however, the automobile is going through deep sand or snow, or over a road full of deep ruts, the operating of the steering mechanism requires the exertion of force, which is sometimes beyond the power of the driver.

The invention consists in the construction and combination of parts shown in the drawings and hereinafter described and pointed out definitely in the appended claims.

In the drawings, Figure 1 is a side view of the steering mechanism of an automobile, to which the present invention is applied, and Fig. 2 is a plan view of the mechanism shown in Fig. 1.

Referring to the parts by reference characters, 24 represents a rocking member which is mounted so that it may rock freely upon a suitably mounted rock shaft 14. This rocking member has an arm 21 which extends downward, and is connected in the usual manner with the steering rod 16 of an automobile. This rocking member has for its upper part a gear segment 25. This rocking member and the parts thereof referred to, together with the steering rod 16 and the usual parts of an automobile which such a steering rod is employed to operate, constitute the mechanism-to-be-operated in accordance with the present invention.

The rock shaft 14 has fixed to it an arm 17 which extends upward alongside of and close to the segment 25; near its upper end this arm is engaged on opposite sides thereof by the two coil springs 26, 27, whose remote ends engage spring seats 28, 29, which are carried by the segment. These spring seats are connected with the ends of screws 28$^a$, 29$^a$, which respectively screw through lugs 25$^a$, 25$^b$, which are rigid with the segment 25, and thereby the tension of the springs may be adjusted as desired. To this rock shaft 14, a worm wheel 12 is fixed, to be engaged by the usual worm carried by the steering post 10 of the automobile. This steering post and the worm thereon, worm wheel, and rock shaft 14 are or may be of the usual construction employed generally on automobiles; and these, together with the arm 17 and adjustable springs, constitute the primary operating instrumentalities by which one may operate the mechanism-to-be-operated as above defined, and cause it to properely perform its function.

30 represents a slow moving reversing electric motor of any conventional or suitable construction. This motor is shown rather diagrammatically since the particular motor construction is not at all material to the present invention. Motors suitable for the purpose are well known. The motor drives a pinion 31 in one direction or the other, as the case may be; and this pinion engages with the gear teeth 25° on the upper periphery of the segment 25. 37 and 38 are two wires which are connected with the motor windings. One of these is connected with an insulated spring 34 and the other with an insulated spring 35, which springs lie on opposite sides of the upper end of the lever 17 and out of contact therewith. The motor construction is such that when the member 17 engages the spring 34 a motor circuit will be completed so as to cause the motor to turn in one direction; while if said member 17 engages the spring 35 the motor will turn in the opposite direction. This motor, in the present exemplification of the invention, the pinion 31 which it drives, and the gear teeth on the segment 25, constitute the secondary motor driven operating instrumentalities for operating the mechanism-to-be-operated as above explained; in other words, for rocking member 24 to cause it to perform its functions.

The car driver will, by turning the steering post 10, cause the rock shaft 14 to rock in the desired direction. As it so rocks the arm 17 will push on the member 24 through one or the other of the springs 26, 27. If there is not much resistance to the movement of said member 14, as will be the case if the car is on a smooth hard road surface, said member 24 and the steering mechanism to which it is connected, will be moved, as required, before the compressed spring is compressed enough to allow the arm 17 to contact with either of the electric contact springs 34, 35. But if the resistance to the movement of the member 24 exceeds a maximum, which is predetermined by the tension of the springs 26, 27, said arm will, by the application of a predetermined force thereto by the driver, so compress spring 26 or 27, as the case may be, without moving member 24, as will cause the arm 17 to contact electrically with one or the other of the springs 34, 35. Thereupon the motor will begin to operate in the direction which will cause member 24 to be rocked thereby in the direction in which the primary operating instrumentality is tending to move it. So long as the driver is able to and does apply to the steering post the force required to move the arm 17 the stated distance relative to the member 24, the motor will continue to operate, and to supplement the primary operating instrumentalities in moving the mechanism-to-be-operated. If, however, the resistance of said mechanism-to-be-operated becomes less than the force required to so move arm 17 relative to member 24, the electrical connection described will be automatically broken, whereupon the motor will stop, and the primary operating instrumentality will resume sole control of the movement of the mechanism-to-be-operated.

Having described my invention, I claim:—

1. The combination with mechanism-to-be-operated, of a primary operating instrumentality therefor capable of moving the mechanism-to-be-operated in either of two opposite directions, a normally inoperative secondary motor-driven operating instrumentality also capable of moving the mechanism-to-be-operated in either of said directions, and means whereby the secondary operating instrumentality will be automatically caused to move in that direction which will cause a movement of the mechanism-to-be-operated in the desired direction when the resistance to such movement in the desired direction exceeds a predetermined maximum.

2. The combination of the mechanism-to-be-operated which is movable in opposite directions from its neutral position, of a primary operating instrumentality capable of moving the same in either direction, a normally inactive reversing electric motor, means operable thereby for moving the mechanism-to-be-operated in either direction, two electric switches in the motor circuit, and means whereby the application of a predetermined force to the primary operating instrumentality to move it in either direction will close one switch or the other depending upon the direction in which said force is applied.

3. The combination with a rocking gear segment, a co-axial but independently movable arm adjacent said gear segment, spring seats carried by said gear segment on opposite sides of said arm, springs compressed between said spring seats and opposite sides of said arm, means for rocking said gear segment, and a pinion engaging said gear segments, a reversible electric motor for operating said pinion, insulated contact springs carried by said gear segment on opposite sides of and adjacent said arm, means connecting said contact springs with said motor in such wise that a motor circuit will be completed by such a movement of the gear segment relative to said arm as will cause one or the other of said springs to contact with said arm.

4. In automobile steering mechanism, the combination of a turnable steering post, two movable parts one of which is operatively connected with the steering post and one with the mechanism for operating the steering wheels of the vehicle, two springs through which motion is respectively transmitted in one direction or the other from one of said movable parts to the other and which permit relative movement of said parts when the resistance of the steering wheels exceeds a predetermined maximum, a secondary motor-driven operating instrumentality for moving in either direction that one of said two movable parts which is connected with the steering wheels, and means which are rendered operative by a predetermined movement of one of said movable parts relative to the other in either direction, for causing the operation of said secondary operating instrumentality.

5. In automobile steering mechanism, the combination of a turnable steering post, a rock shaft adapted to be operated thereby, an arm fixed to said rock shaft, a gear segment rotatably mounted upon the rock shaft and provided with an arm, the steering rod of an automobile operatively connected with the last mentioned arm, adjustable springs opposing the relative movement of said gear segment and co-axial arm referred to, a pinion engaging said gear segment, a normally inactive motor for operating said pinion, and means which are caused to operate by a predetermined relative movement of said arm relative to the adjacent gear segment for causing said motor to operate.

In testimony whereof I hereunto affix my signature.

ALANSON P. BRUSH.